United States Patent Office 3,652,714
Patented Mar. 28, 1972

3,652,714
DYEABLE BLENDS OF POLY(ETHYLENE TEREPHTHALATE) AND POLYESTERETHER POLYMERS
Richard S. Berger, Bartlesville, Okla., assignor to Phillips Petroleum Company
No Drawing. Filed Feb. 20, 1970, Ser. No. 13,211
Int. Cl. C08g 39/10; D06 3/04, 3/36
U.S. Cl. 260—860      9 Claims

ABSTRACT OF THE DISCLOSURE

The disperse dyeability and dry cleaning fastness of poly(ethylene terephthalate) melt-spun fibers are greatly improved by blending the synthetic fiber-forming poly(ethylene terephthalate) with at least one polyesterether polymer.

---

This invention relates to a process for improving the dispperse dyeability and dry cleaning fastness of poly(ethylene terephthalate) melt-spun fibers. This invention relates to a polymeric composition comprising a blend of poly(ethylene terephthalate) with polyesterether polymers. This invention further relates to an improved disperse dyeable and dry cleaning fast melt-spun fiber comprising poly(ethylene terephthalate) and polyester-ether polymers.

It has now been discovered that the disperse dyeability and dry cleaning fastness of poly(ethylene terephthalate) melt-spun fibers is greatly improved by blending the synthetic fiber-forming poly(ethylene terephthalate) with a polyesterether polymer in an amount sufficient to provide from about 1 to 100, preferably 5 to 20, parts by weight of said polyesterether polymer per 100 parts by weight of said poly(ethylene terephthalate).

The improvement in the disperse dyeability and dry cleaning fastness of the melt-spun fibers comprising the poly(ethylene terephthalate) blend is particularly surprising in that the valuable characteristics of the poly(ethylene terephthalate) constituent, such as tenacity, elongation, modulus, Uster evenness, and shrinkage, are essentially retained by the blend.

These outstanding improvements, achieved according to my invention, are truly startling in that melt-spun fibers prepared from either poly(ethylene terephthalate) or melt-spun fibers prepared from polyesterether polymers do not themselves have the disperse dyeability and dry cleaning fastness of the melt-spun fibers prepared from the polymer blends of this invention.

According to my invention, a polymeric composition adapted for use in preparing melt-spun fibers having greatly improved disperse dyeability and dry cleaning fastness is prepared by blending a poly(ethylene terephthalate) which is capable of being formed into fibers by melt-spinning procedures with a class of polyesterether polymers.

The polyesterether polymers employed according to this invention are conventional and are themselves capable of being formed into fibers by melt-spinning procedures. Polyethylene oxybenzoate is the preferred polyesterether employed according to this invention and is substantially composed of the repeating unit as indicated by the following general formula

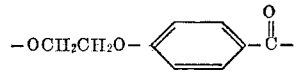

Thus conventional polyesterethers that can be employed can be represented by polymers having repeating units of the exemplary general formulas that follow:

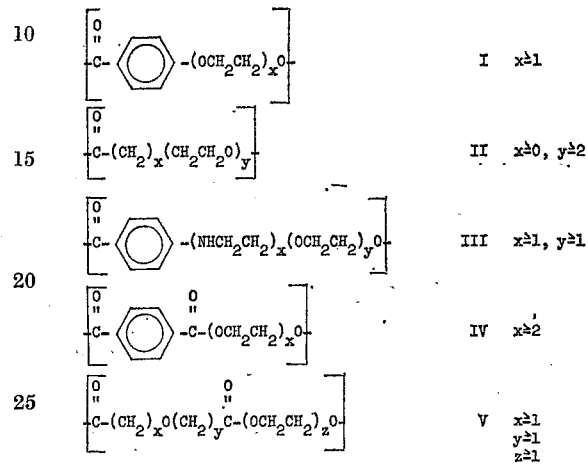

Any polyesterethers that are fiber-forming polymers including any of the well-known highly polymeric linear polyesterethers employed in the preparation of synthetic organic fibers by melt-spinning methods can be employed according to this invention.

The preparation of synthetic fibers by melt-spinning techniques is well known and described in numerous patents and literature references. The preparation, physical and chemical characteristics, the details or how melt-spinning compositions are prepared containing these fiber-forming materials, numerous additives which can be incorporated therein, conditions under which such compositions can be spun to form fibers, the apparatus and method of operating the apparatus used in forming such fibers, twisting of the yarns, knitting, weaving, tufting, preparation of nonwoven fabrics, manufacture of ropes, and the like are typical information the prior art clearly explains and is readily available in issued patents and literature publications and is quite familiar to those skilled in the art. It is obvious therefore that reiteration of what is conventional and well known would serve only to length this application. Suffice it to say that the polyesterether polymers can be blended with the poly(ethylene terephthalate) according to any of the conventional blending methods and similarly formed into fiber by conventional melt-spinning techniques. For example, ground pellets of the poly(ethylene terephthalate) and ground pellets of the polyesterether polymer can be passed to an extruder and mixed in a molten state and formed into fiber by employing a fiber-extruder. The polymer pellets can be premixed, if desired, and blended in the molten state, pelletized and then passed to a fiber-extruder if desired. The method by which polyesterether polymer is incorporated with the poly(ethylene terephthalate) is not critical but it is desired that the components be thoroughly blended to insure a homogeneous mixture for preparing the fiber by conventional melt-spinning methods.

As hereinbefore stated, the dyes applicable according to this invention are conventionally categorized as disperse dyes. The Encyclopedia of Polymer Science and Technology, vol. 5, at pages 269–280, Interscience Publications, New York, 1966 discloses exemplary disperse dyes that can be suitably employed.

Various carriers, which are reagents which swell fibers and ease the peneration of the dyes into the fiber, can be employed according to this invention if desired. Carolid Flakes is a carrier manufactured by Tanatex Chemical Corporation and is a non-ionic modified biphenyl derivative which is an exemplary carrier which can be employed according to this invention. It should be noted, however, that both with and without a carrier, the polyesterether polymer increases the dyeability of poly(ethylene terephthalate) and oftentimes the fibers dyed according to this invention without a carrier are more deeply dyed than poly(ethylene terephthalate) dyed with a carrier at the same dye level.

Summarily, dyeability and dry cleaning fastness of poly(ethylene terephthalate) fiber, represented by repeating units as indicated by the following general formula:

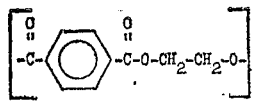

are greatly improved by blending with the poly(ethylene terephthalate) a polyesterether polymer prior to melt-spinning said fiber.

Illustrative of the foregoing discussion and not to be interpreted as a limitation on the scope thereof, or on the materials herein employed, the following examples are presented.

EXAMPLE I

Three series of samples were prepared to demonstrate the attributes of this invention. The first series, A, was formed from poly(ethylene terephthalate). The second series, B, was prepared from polyesterether, i.e., poly(ethylene oxybenzoate). The third series, C, representing this invention, was prepared from a blend of 100 parts by weight of poly(ethylene terephthalate) and 10 parts by weight of poly(ethylene oxybenzoate). The series C samples were prepared by adding a mixture of the two polymers to a fiber extruder wherein the polymers were mixed in the molten state and extruded as fibers. All of the fibers employed in these runs were melt-spun and drawn to a draw ratio of 4. They were formed into tubular knitted fabric samples or into staples, then dyed, and evaluated.

The denier of the yarn (total denier/filaments) comprising the knitted fabric samples of Series A, B, and C, respectively was 232/16, 235/16, and 236/16. The Series A and C samples were melt-spun at 550° F. To provide better spinning, Series B was melt-spun at 520° F.

The evaluation of the dyed knitted fabrics is reported in Table I and an evaluation of the dyed staple reported in Table II.

TABLE I.—EVALUATION OF KNITS

| Run No. | Series [1] | Percent OWF [2] Dye [3] | Percent OWF [2] Carrier [4] | Visual rank [5] | Area under reflectance curve [(in.) $^2$] [6] | K/S [7] | D.C., Grey scale [8] |
|---|---|---|---|---|---|---|---|
| 1 | A | 2.0 | | 3 | 8.99 | 6.63 | 4 |
| 2 | B | 2.0 | | 2 | 7.89 | 11.5 | 3–4 |
| 3 | C | 2.0 | | 1 | 4.97 | 14.4 | 3–4 |
| 4 | A | 5.0 | | 3 | 8.11 | 7.50 | 3–4 |
| 5 | B | 5.0 | | 2 | 7.18 | 13.0 | 4 |
| 6 | C | 5.0 | | 1 | 4.80 | 15.6 | 4 |
| 7 | A | 2.0 | 20.0 | 3 | 6.21 | 10.6 | 3–4 |
| 8 | B | 2.0 | 20.0 | 2 | 5.40 | 16.1 | 3–4 |
| 9 | C | 2.0 | 20.0 | 1 | 4.57 | 16.1 | 4–5 |
| 10 | A | 5.0 | 20.0 | 3 | 3.95 | 13.6 | 2 |
| 11 | B | 5.0 | 20.0 | 2 | 3.64 | 19.0 | 3 |
| 12 | C | 5.0 | 20.0 | 1 | 2.34 | 20.0 | 4–5 |

[1] As described, Series A is 100% poly(ethylene terephthalate); Series B 100% poly(ethylene oxybenzoate); Series C, 100 parts by wt. poly(ethylene terephthalate) plus 10 parts by weight poly(ethylene oxybenzoate).
[2] On weight of fiber—indicates the dye is added as a weight percentage of the fiber being dyed.
[3] Terasil Blue BGL.
[4] Carolid Flakes.
[5] Visual rank as to deepness of color shade—1 is best.
[6] As determined by Color-Eye (Instrument Development Laboratories) and calculated with Planimeter; the lower values represent deeper shades of color.
[7] $K/S = \frac{(1-R)^2}{2R}$, where R=decimal fraction of light reflected from the dyed sample as determined by Color-Eye; the higher K/S values indicate greater depth of shade.
[8] Drycleaning fastness determined according to AATCC 132-1969; 5 rating is best indicating no color change.

TABLE II.—EVALUATION OF STAPLE

| Run No. | Series [1] | Percent OWF [1] Dye [1] | Percent OWF [1] Carrier [1] | Visual rank [1] | K/S [1] | D.C., Grey scale [1] |
|---|---|---|---|---|---|---|
| 1 | A | 2.0 | | 2 | 2.26 | 3–4 |
| 2 | C | 2.0 | | 1 | 6.61 | 4–5 |
| 3 | A | 5.0 | | 2 | 2.27 | 3 |
| 4 | C | 5.0 | | 1 | 7.96 | 4 |
| 5 | A | 2.0 | 20.0 | | 3.64 | 3–4 |
| 6 | C | 2.0 | 20.0 | | 8.73 | 4 |
| 7 | A | 5.0 | 20.0 | 2 | 3.68 | 3–4 |
| 8 | C | 5.0 | 20.0 | 1 | 9.02 | 4 |

[1] As reported in Table I.

The above runs clearly demonstrate that fibers prepared from a blend of 100 parts by weight of poly(ethylene terephthalate) and 10 parts by weight of poly(ethylene oxybenzoate) have better color yield and dry cleaning fastness than fibers prepared from either of the two components alone.

EXAMPLE II

Runs were conducted to demonstrate that the important properties of the poly(ethylene terephthalate) had been retained in the fiber prepared from the blend. Typical fibers were prepared as in Example I. They were evaluated and their properties reported in Table III.

TABLE III

| Run No. | Composition | Total den./filament | Uster evenness, percent | Tenacity, g./den. | Elongation, percent | 5% modulus, g./den. | Init. modulus, g./den. | Boiling water shrinkage, percent |
|---|---|---|---|---|---|---|---|---|
| 1 | Poly(ethylene terephthalate) | 470/32 | 1.65 | 3.59 | 50 | 39 | 87 | 4.0 |
| 2 | 100 parts by weight poly(ethylene terephthalate) with 10 parts by weight of poly(ethylene oxybenzoate). | 473/32 | 1.75 | 3.41 | 53 | 34 | 81 | 5.0 |

The above data clearly demonstrates that the composition of this invention retains the important properties of the poly(ethylene terephthalate) component.

As will be evident to those skilled in the art, various modifications of this invention can be made or followed in light of the discussion and disclosure herein set forth without departing from the scope or the spirit thereof.

I claim:
1. A composition which is suitable for use in preparing by a melt-spinning process polymeric synthetic fibers with improved disperse dyeability and dry cleaning fastness, said composition comprising a mixture of
   (a) poly(ethylene terephthalate) and
   (b) a poly(esterether) having repeating units selected from the group consisting of

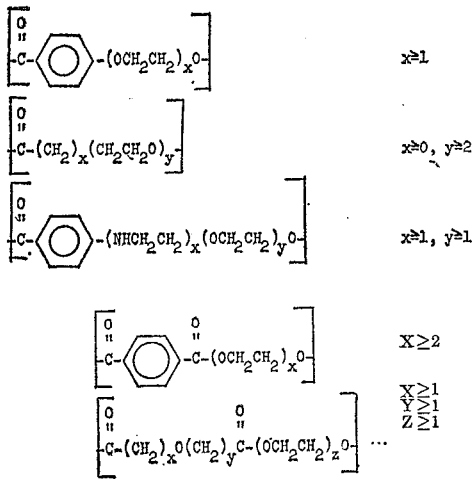

said poly(esterether) being employed in an amount to provide from 1–100 parts by weight of said poly(esterether) per 100 parts by weight of said poly(ethylene terephthalate).

2. The composition of claim 1 wherein said (B) component is employed in an amount to provide from about 5 to 20 parts by weight of (B) per 100 parts by weight of (A) and wherein said (B) component is a polymer comprising polyethylene oxybenzoate.

3. The composition of claim 2 wherein said (B) component is employed in an amount to provide about 10 parts by weight of (B) per 100 parts by weight of (A).

4. A process for providing melt-spun poly(ethylene terephthalate) dyed fibers having good dry cleaning fastness said process comprising incorporating into said poly(ethylene terephthalate) from 1 to 100 parts by weight of said polyethylene terephthalate of a fiber forming poly(esterether) having repeating units selected from the group consisting of:

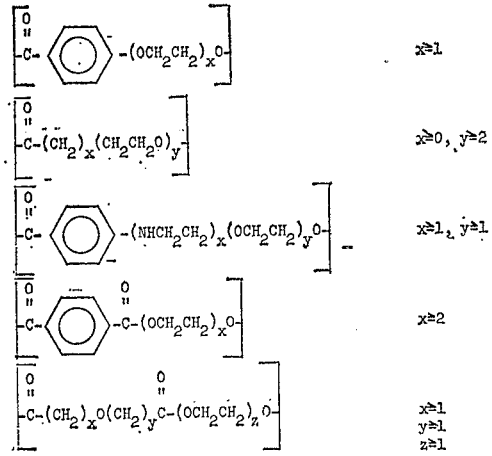

melt-spinning said thus formed mixture to form a polymeric synthetic fiber; and
subjecting said thus formed fiber to a disperse dye.

5. The process according to claim 4 wherein said polymer of poly(esterether) is employed in an amount to provide from about 5 to 20 parts by weight per 100 parts by weight of said poly(ethylene terephthalate).

6. The process according to claim 5 wherein said polymer of polyesterether comprises poly(ethylene oxybenzoate).

7. The process according to claim 6 wherein said poly(ethylene oxybenzoate) is employed in an amount to provide about 10 parts by weight thereof per 100 parts by weight of said poly(ethylene terephthalate).

8. The melt-spun fiber prepared according to the process of claim 4.

9. The melt-spun fiber prepared according to the process of claim 6.

References Cited

UNITED STATES PATENTS 3,381,057  4/1968  Senoo et al _____ 260—860
3,410,927  11/1968 Crovatt _____ 260—860

FOREIGN PATENTS 132,546  5/1949  Australia _____ 260—860

WILLIAM H. SHORT, Primary Examiner

E. WOODBERRY, Assistant Examiner

U.S. Cl. X.R.

8—115.5, DIG. 4